(12) United States Patent
Freyhult

(10) Patent No.: US 7,573,488 B2
(45) Date of Patent: Aug. 11, 2009

(54) SYSTEM AND METHOD FOR ORGANIZING TWO AND THREE DIMENSIONAL IMAGE DATA

(75) Inventor: Peter Freyhult, Vasteras (SE)

(73) Assignee: ABB AB, Vasteras (SE)

( * ) Notice: Subject to any disclaimer, the term of this patent is extended or adjusted under 35 U.S.C. 154(b) by 7 days.

(21) Appl. No.: 11/200,805

(22) Filed: Aug. 10, 2005

(65) Prior Publication Data

US 2006/0033756 A1 Feb. 16, 2006

Related U.S. Application Data

(63) Continuation of application No. 09/835,004, filed on Apr. 13, 2001, now abandoned.

(51) Int. Cl.
G09G 5/00 (2006.01)
G06K 9/32 (2006.01)
G06K 9/54 (2006.01)

(52) U.S. Cl. ............... 345/629; 345/619; 382/299; 382/302

(58) Field of Classification Search ............. 345/619, 345/629, 418; 382/299, 302
See application file for complete search history.

(56) References Cited

U.S. PATENT DOCUMENTS

| | | | |
|---|---|---|---|
| 4,827,413 A | 5/1989 | Baldwin et al. |
| 4,885,703 A | 12/1989 | Deering |
| 5,432,894 A | 7/1995 | Funaki |
| 5,611,035 A | 3/1997 | Hall |
| 5,857,036 A | 1/1999 | Barnsley et al. |

(Continued)

FOREIGN PATENT DOCUMENTS

WO WO-97/13219 4/1997

(Continued)

OTHER PUBLICATIONS

Lin et al., "A Pyrimid Algorithm for Fast Fractal Image Compression", IEEE International Conf. Image Processing, vol. 3, Jan. 1, 1995, pp. 596-599.

(Continued)

*Primary Examiner*—Chante Harrison
(74) *Attorney, Agent, or Firm*—Winstead PC

(57) ABSTRACT

A method and system are disclosed for storing, retrieving and otherwise handling two and/or three dimensional image data forming a picture or image. The picture is defined by a plurality of levels, each level including a plurality of subpicture areas corresponding to a different level of image data resolution relative to image data resolution levels corresponding to subpicture areas in other levels. The method and system include selecting a subpicture element having image data for inclusion in the picture and identifying a subpicture area in which the subpicture element may be placed. The method and system further include placing the image data of the subpicture element in the identified subpicture area. Upon a determination that the amount of image data in the identified subpicture area exceeds a predetermined maximum amount following the placing operation, the system and method identify overlapping subpicture areas in a level corresponding to the next higher image data resolution level that overlaps the identified subpicture area. Following the identifying operation, the system and method place image data of one or more subpicture elements from the identified subpicture area into at least one of the overlapping subpicture areas.

20 Claims, 3 Drawing Sheets

U.S. PATENT DOCUMENTS

| | | | |
|---|---|---|---|
| 6,326,965 B1 * | 12/2001 | Castelli et al. | 345/629 |
| 6,493,858 B2 * | 12/2002 | Solomon | 716/11 |
| 6,912,695 B2 * | 6/2005 | Ernst et al. | 715/792 |
| 6,985,638 B1 * | 1/2006 | Aoki | 345/645 |
| 2002/0057850 A1 * | 5/2002 | Sirohey et al. | 382/299 |
| 2006/0256130 A1 * | 11/2006 | Gonzalez | 345/619 |

FOREIGN PATENT DOCUMENTS

| WO | WO-97/14113 | 4/1997 |
|---|---|---|

OTHER PUBLICATIONS

Po et al., "A Novel Subtree Partitioning Algorighm for Wavelet-Based Fractal Image Coding", Proceedings of 1998 IEEE International Conference on Acoustics, Speech, and Signal Processing, 1998, pp. 2677-2680.

Davis, "A Wavelet-Based Analysis of Fractal Image Compression", IEEE Transactions on Image Processing, vol. 7, Feb. 1998, No. 2, pp. 141-154.

* cited by examiner

SYSTEM AND METHOD FOR ORGANIZING TWO AND THREE DIMENSIONAL IMAGE DATA

CROSS-REFERENCE TO RELATED APPLICATIONS

This application is a continuation of, and incorporates by reference the entire disclosure of, U.S. patent application Ser. No. 09/835,004, filed Apr. 13, 2001 now abandoned

BACKGROUND OF THE INVENTION

1. Technical Field of the Invention

The present invention relates to handling graphic data, and particularly to a system and method for handling two and three dimensional data forming a picture image.

2. Description of the Related Art

Computer based control systems are known to present a visual display of an activity that is thereupon used to monitor or control that activity. Graphical pictures or images are commonly used to form a model of an activity or process. Traditionally, computer based control systems use two dimensional models. Due to an increased need for providing a model having additional information so as to provide better control over a process, a two dimensional model is, in many instances, insufficient.

In organizing and presenting a visual display of a picture, some prior and existing control systems have divided a picture image into a plurality of subpictures. One problem encountered is that the amount of data within the subpictures forming a picture image may vary considerably. Because system resources are taxed simply by loading and handling a subpicture for inclusion within a picture to be visually displayed, subpictures having both large and small amounts of data may adversely effect the overall performance of the control system. Based upon the foregoing, there is a need for more efficiently storing, retrieving and otherwise handling image data forming a picture.

SUMMARY OF THE INVENTION

The present invention overcomes the shortcomings in prior systems and thereby satisfies a significant need for a graphics system and method that more effectively organizes or otherwise handles data forming a two or three dimensional picture or image. According to an embodiment of the present invention, the picture is divided into a number of subpictures, wherein subpictures having different resolutions are placed in different levels that are stacked in relation to each other. The picture is defined by a plurality of levels, each level including a plurality of subpicture areas corresponding to a different level of image data resolution relative to image data resolution levels corresponding to subpicture areas in other levels. The method and system include selecting a subpicture element having image data for inclusion in the picture image and identifying a subpicture area in which the subpicture element may be placed, the identified subpicture area being in the lowest possible level of the picture image. The method and system further include placing the image data of the subpicture element in the identified subpicture area. Upon a determination that the amount of image data in the identified subpicture area exceeds a predetermined maximum amount following the placing operation, the system and method identify overlapping subpicture areas in a level corresponding to the next higher image data resolution level that overlaps the identified subpicture area. Following the identifying operation, the system and method place image data of one or more subpicture elements from the identified subpicture into at least one of the overlapping subpicture areas. By incorporating or otherwise adding a picture element into a picture structure in this manner, subpictures are better grouped for transport and storage within the system.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
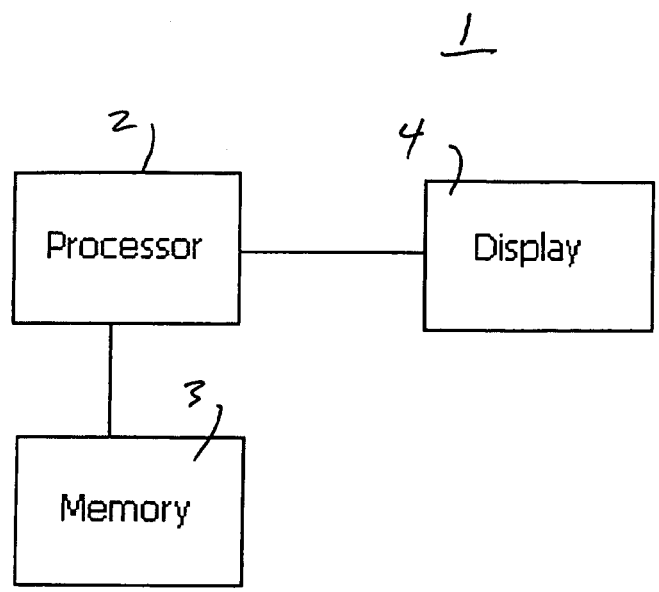
FIG. 1 is a block diagram of a graphics system in accordance with an embodiment of the present invention.

Referring to FIG. 1, there is shown a graphics system 1 for displaying or otherwise handling two or three dimensional data. For reasons of simplicity and in accordance with an embodiment of the present invention, graphics system 1 will be described as part of an industrial or process control system. In such a system, graphical picture images are generated to provide a model, such as a geographical or schematic model of the process being controlled. It is understood, however, that graphics system 1 may be other types of systems for handling and displaying graphical data.

According to the disclosed embodiment of the present invention, graphics system 1 includes a processor 2 that is capable of performing a number of operations for retrieving and processing graphics information. For example, processor 2 may be a microprocessor commonly found in a personal computer.

Graphics system 1 further includes memory 3 coupled to processor 2 and having stored therein software code for allowing processor 2 to, among other operations, receive and process graphics data for visual display. Memory 3 may be further capable of storing the graphics data. Graphics system 1 may further include a secondary memory device (not shown). The software code instructions stored in memory 3 and the operations performed by processor 2 will be described in greater detail below.

Graphics system 1 further includes a display device 4 coupled to processor 2 for displaying graphics data. The graphics data may be two or three dimensional data. It is understood that graphics system 1 includes user controls for, among other things, controlling the image of graphics information.

In general terms, graphics system 1 organizes graphics data forming a picture image so as to substantially optimize graphics data retrieved from memory 3 for presentation on display device 4. Graphics system 1 divides the graphics data forming a picture image into a plurality of subpictures. The subpicture grids are disposed onto a plurality of levels of differing resolution levels that are arranged in a stacked relationship. By placing image data within these subpictures in accordance with a predetermined algorithm, each subpicture is sized within a predetermined size range so as to substantially minimize the amount of data transported between processor 2, memory 3 and display device 4.

Figure 2:
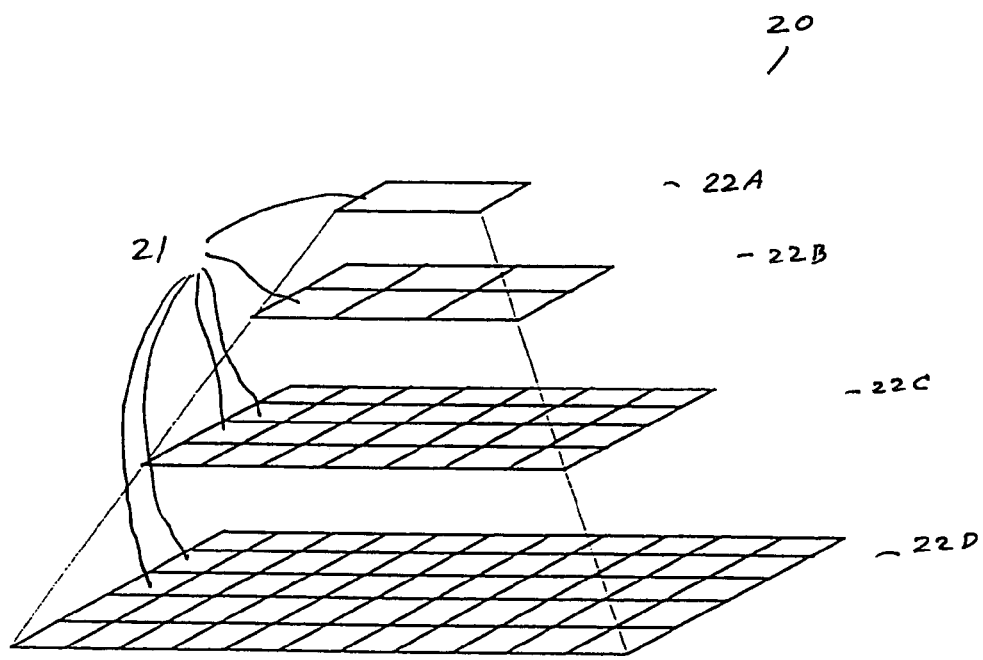
FIG. 2 is a diagram illustrating the basic structure of a picture utilized by the graphics system of FIG. 1.

At this point, image related terms will be defined with reference to FIG. 2. A "picture image" and/or "picture" 20 is defined as an independent set of related coordinate based image data that provides a model of a dynamic process, such as a process being controlled in part by graphics system 1. An "extent" refers to a dataset position in coordinate space having a coordinate position and a size or dimension in coordinate directions surrounding or otherwise in proximity to the coordinate position. An "element" is defined as a set of image data belonging to a picture image 20 having a common extent and lacking any other reference to other parts of picture image 20. A "subpicture" 21 refers to a portion of picture image 20 and is itself a picture limited to elements from a portion of the coordinate space encompassed by picture 20. A subpicture 21 may be classified as being 1) "uninstantiated" when no data structures for the subpicture exist; 2) "instantiated" when a data structure of the subpicture 21 exists; and 3) "loaded" when an instantiated data structure for subpicture 21 and elements are transferred from secondary memory to memory 3.

In addition, a subpicture 21 has "overflowed" when the amount of image data therein exceeds a predetermined maximum amount. For example, the predetermined maximum amount may be 1000 elements. A subpicture 21 is uninstantiated if the amount of image data therein is less than a predetermined minimum amount. For example, the predetermined minimum amount may be ten elements.

A "level" 22 (FIG. 2) is defined as a set of subpictures 21 having an amount of image data resolution that is different from the amount of image data resolution at other levels. All subpictures 21 in the level 22 together cover the entire coordinate space of picture image 20 and do not overlap. Each level 22 has a unique characteristic that may be utilized together extent to distribute elements among the subpictures 21. For example, a characteristic of a level 22 may be a zoom level or z-coordinate.

Further, a "picture scheme" is a complete organizational description of all subpictures 21 forming a picture 20. A picture scheme is "exhausted" when the subpicture structure of the picture scheme overflows with elements of image data.

An element "fits" within a subpicture 21 if the element's extent is substantially entirely within the extent of the subpicture 21. The level definition of an element is consistent with the level characteristics of the corresponding level 22.

The described embodiment of the present invention is directed towards organizing or otherwise handling image data so as to substantially optimize the storage and transport of the image data between processor 2, memory 3 and display device 4. In particular, the handling of an element corresponding to a picture will be described with reference to FIGS. 3 and 4.

Initially, graphics system 1 defines or is provided with a picture scheme at step 31 for handling image data for forming a picture 2. In this case, the picture scheme defines picture 20 as having four levels 22A-22D of subpictures 21, as shown in FIG. 2. The picture scheme defines the uppermost level 22A as having a single subpicture 21 with a low level of resolution, with each level below level 22A having an increasing number of subpictures and a higher level of resolution.

Upon receiving an element corresponding to picture 20 at step 32, processor 2 identifies at step 33 a subpicture 21 in the lowest most level 22 in which the received element may fit. The identified subpicture 21 is loaded if the identified subpicture 21 has not yet been loaded. The received element is then placed in the identified subpicture 21 at step 34.

At this point, graphics system 1 operates to divide the image data amongst the subpictures 21 so as to improve data transport within graphics system 1. If the number of elements now within identified subpicture 21 is less than the predetermined maximum amount, the inclusion of the received element into and/or within picture 20 is complete. On the other hand, if the number of elements now within identified subpicture 21 exceeds the predetermined maximum amount, graphics system 1 then determines at step 35 whether the identified subpicture 21 is at the lowest level 22 of picture 20. Upon the determination that the identified subpicture 21 is at the lowest level 22 of picture 20, the picture scheme is exhausted and a routine for redefining the picture scheme is initiated at step 36. This routine will be described in detail below. Upon the determination that the identified subpicture 21 is not at the lowest most level 22, graphics system 1 identifies at step 37 all of the overlapping subpictures 21 in the next lower level 22 having extents which overlap extents of the identified subpicture 21. If no such overlapping subpictures 21 are identified, the routine for redefining the picture scheme is initiated. Otherwise, graphics system 1 then sorts at step 38 the overlapping subpictures 21 in a list of overlapping subpictures in descending order of the number of elements that the overlapping subpictures 21 may receive from the identified subpicture 21, with respect to extent and level.

Thereafter, graphics system 1 examines each overlapping subpicture 21 sequentially, starting with the overlapping subpicture 21 at the top of the list and examining each overlapping subpicture 21 in descending order. For each overlapping subpicture 21 examined, graphics system 1 first determines at step 40 whether the corresponding number of overlapping elements that the overlapping subpicture 21 may receive from the identified subpicture 21 is greater than the predetermined minimum number of elements. If not, the picture scheme is exhausted and the routine for redefining the picture scheme is initiated. Otherwise, the examined overlapping subpicture 21 is added to a "subpicture to instantiate" list at step 41. A determination is made at step 42 whether the number of elements that would remain in the identified subpicture 21 less the corresponding number of overlapping elements is less than the predetermined maximum amount of elements in a subpicture. If the number of remaining elements still exceeds the predetermined maximum amount, then the next overlapping subpicture 21 in the list is examined and steps 40-41 repeated therefor. If there are no more overlapping subpictures 21 in the list, picture scheme is exhausted and the routine for redefining the picture scheme is initiated.

If the number of remaining elements is less than the predetermined maximum amount of elements, graphics system 1 sequentially removes each overlapping subpicture 21 from the "subpicture to instantiate" list and instantiates each at step 43. For each instantiated overlapping subpicture 21, graphic system 1 identifies all of the instantiated subpictures 21 appearing on the next higher level 22 having an extent that overlaps the instantiated overlapping subpicture 21 at step 44, moves all elements from the identified instantiated subpictures 21 from step 44 into the instantiated overlapping subpicture 21 at step 45, and returns to step 35 if the number of elements in the particular instantiated overlapping subpicture 21 exceeds the predetermined maximum amount of elements. When steps 44 and 45 have been performed for all of the overlapping subpictures 21 in the "subpicture to instantiate" list, the incorporation of the received element into picture 20 is complete.

The routine for redefining the picture scheme, executed upon a determination that the picture scheme is exhausted, will be described with reference to FIG. 4. The "subpictures to instantiate" list and the "overlapping subpicture" list are cleared at step 50. Next, graphics system 1 loads in step 51 all of the instantiated subpictures 21 in picture 20 that have not yet been instantiated. All of the elements from the instantiated subpictures 21 are extracted and added to a "total" list in step 52. Picture 20 and the corresponding picture scheme are then deleted in step 53. A new picture 20 and picture scheme are then received and instantiated together with the uninstantiated subpictures 21 at step 54. The elements appearing in the "total" list are then successively added to the new picture 20 using the operation illustrated in FIG. 3. Thereafter, the received element (step 32) has been successively incorporated within picture 20 and particularly within a particular subpicture 21 of picture 20.

Figure 3:
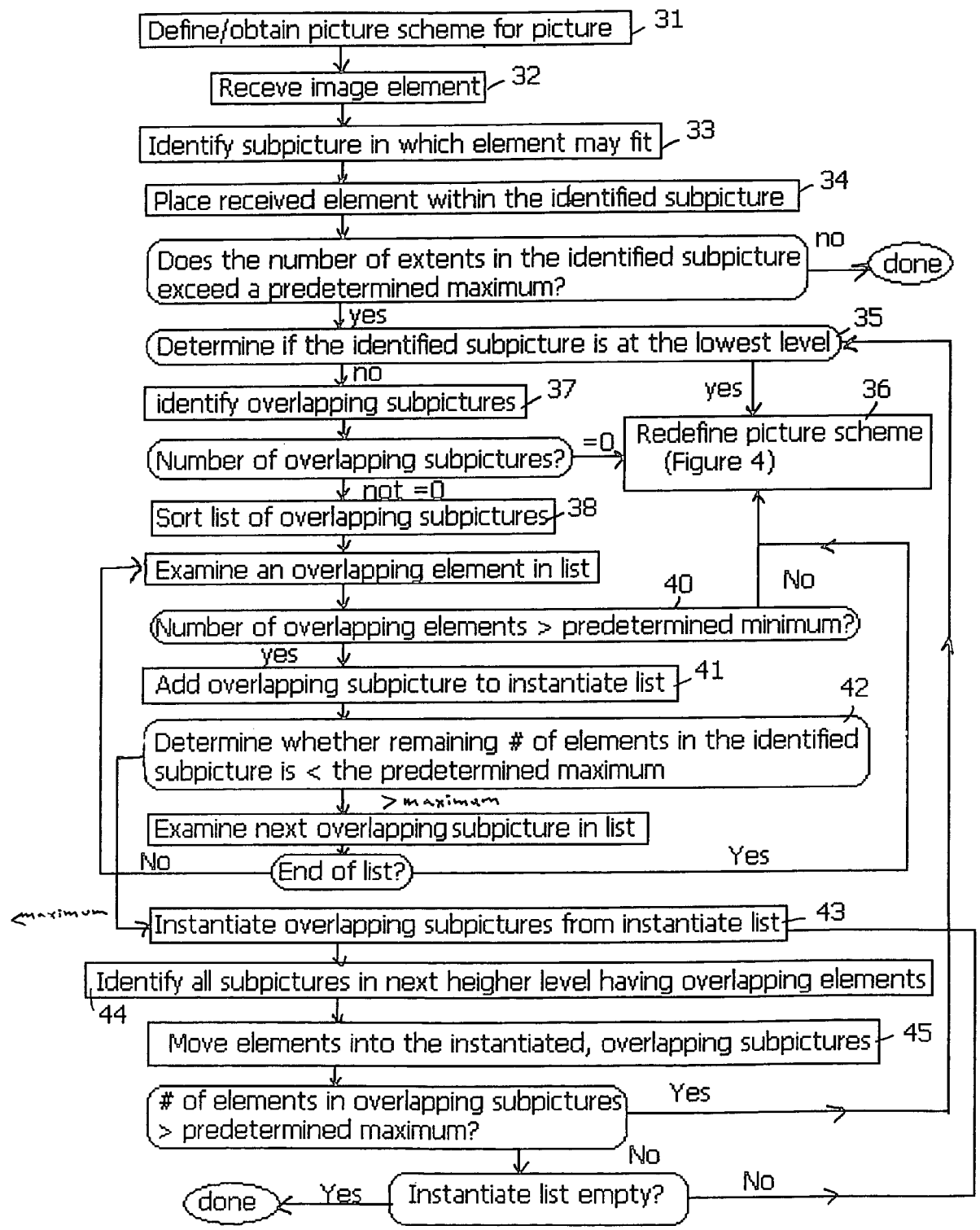
FIG. 3 is a flow chart illustrating an operation of the graphics system of FIG. 1.
Figure 4:
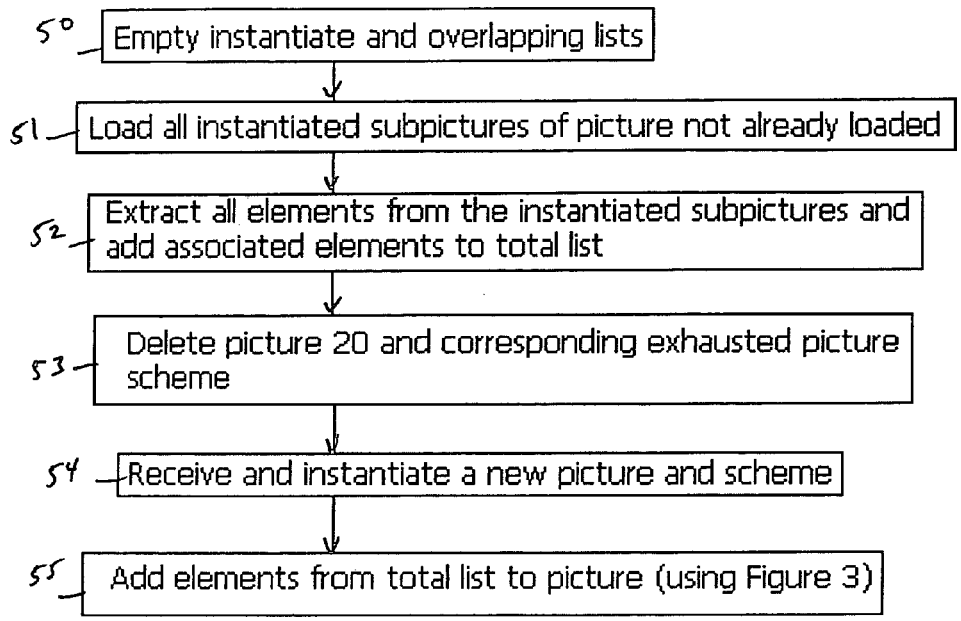
FIG. 4 is another flow chart illustrating another operation of the graphics system of FIG. 1.
Figure 5:
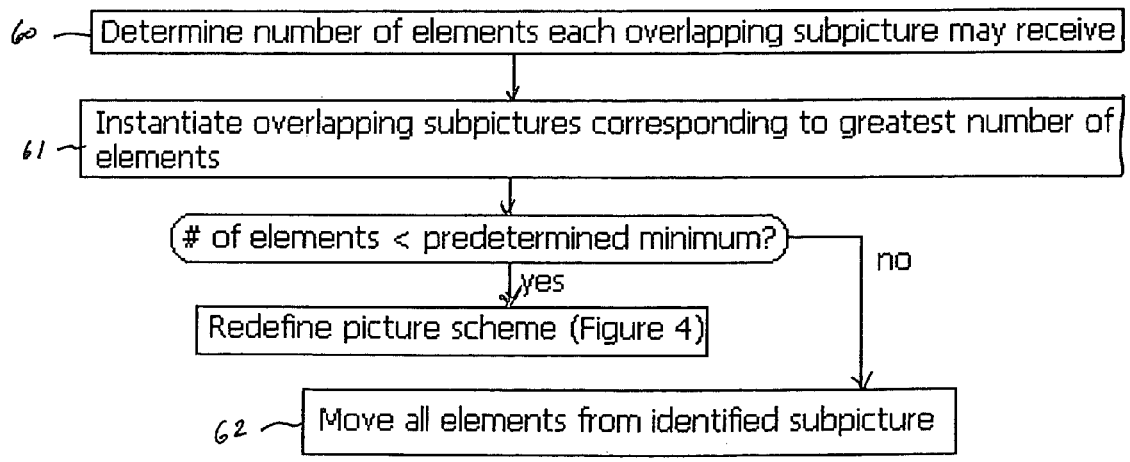
FIG. 5 is a portion of an alternative flow chart illustrating an alternative operation of the graphics system of FIG. 1.

As can be seen, the operation shown in FIG. 3 results in the same distribution of elements within picture 20 regardless of the order in which the elements are incorporated in picture 20. Instead of steps 38-45, an alternative embodiment may include the steps of determining the number of elements each overlapping subpicture 21 may receive from the identified subpicture 21 at step 60 with respect to extent and level (FIG. 6), and instantiating each overlapping subpicture 21 having the most receivable elements at step 61. In the event the number of elements corresponding to the overlapping subpicture 2 capable of receiving the greatest number of elements is not greater than the predetermined minimum number of elements, the picture scheme is exhausted and the routine of FIG. 4 is performed. If not, the elements from the identified subpicture 21 that fit within the instantiated, overlapping subpicture 2 of step 61 that fit therein at step 62. Steps 61 and 62 are repeated for each overlapping substructure 21.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of storing image data of a picture in a plurality of levels, each level corresponding to a specific resolution level of the image data, said method comprising:
   receiving an element of the picture for storing on one of the plurality of levels of image data;
   wherein each level of the plurality of levels comprises a set of subpictures having an amount of image data resolution that is different from an amount of image data resolution at other levels, each said level having a different number of subpictures;
   wherein the set of subpictures in each said level of the plurality of levels is operable to cover an entire coordinate space of the picture without overlap;
   identifying a subpicture in a lowest one of the plurality of levels in which the received element may be placed, wherein the lowest level represents a lowest resolution of image data, and wherein each subpicture stores a predetermined maximum amount of elements;
   determining whether the identified subpicture has previously been loaded;
   if the identified subpicture is determined not to have been loaded, loading the identified subpicture;
   placing the received element in the identified subpicture;
   determining if a number of elements in the identified subpicture exceeds the predetermined maximum;
   if the number of elements in the identified subpicture exceeds the predetermined maximum, identifying a number of overlapping subpictures, in a higher one of the plurality of levels, into which the received element may be placed, wherein the higher level represents a higher resolution of image data than the lowest level, and wherein the subpicture in the higher level is capable of storing a larger number of elements than the subpicture in the lowest level; and
   wherein each subpicture of the plurality of subpictures is created by successively filling a limited predetermined size of memory with image data.

2. The method of claim 1 further comprising:
   determining if a number of elements in the identified subpicture of the higher level exceeds the predetermined maximum; and
   if the number of elements in the identified subpicture of the higher level exceeds the predetermined maximum, identifying a number of overlapping subpictures, in a next higher one of the plurality of levels, into which the received element may be placed, wherein the next higher level represents a higher resolution of image data than the higher level.

3. The method of claim 1, wherein if the number of overlapping subpictures is zero, the method further comprises redefining the subpictures of the picture.

4. The method of claim 1, further comprising:
   receiving a new element of the picture for storing in one of the plurality of levels of image data; and
   repeating the steps of identifying, placing, and determining for the new element of the picture.

5. The method of claim 1, further comprising:
   loading the identified subpicture prior to placing the received element in the identified subpicture.

6. The method of claim 1, wherein the step of identifying a number of overlapping subpictures further comprises:
   sorting a list of overlapping subpictures; and
   examining an overlapping element in the list.

7. The method of claim 6, further comprising:
   adding the overlapping subpicture to an instantiation list; and
   instantiating the overlapping subpictures from the instantiation list.

8. The method of claim 1, wherein the picture comprises an image with three-dimensional data.

9. A system for storing image data related to a picture, the system comprising:
   a processor;
   a memory interoperably coupled with the processor and having computer software code stored therein;
   wherein the processor and memory operate in combination on the picture;
   at least one extent defining a dataset position in coordinate space by defining a coordinate position and a size in coordinate directions around the coordinate position;
   at least one element defining a set of data belonging to the picture and having a common extent;
   a plurality of subpictures defining a portion of the picture, each subpicture capable of storing a predetermined maximum amount of data;

a plurality of levels arranged in a stacked relationship, wherein each level of the plurality of levels comprises a set of subpictures having an amount of image data resolution that is different from an amount of image data resolution at other levels, each said level having a different number of subpictures;

wherein the set of subpictures in each said level of the plurality of levels is operable to cover an entire coordinate space of the picture without overlap;

wherein a subpicture in a higher level of the plurality of levels is capable of storing a larger predetermined maximum amount of data than a subpicture in a lower level of the plurality of levels; and wherein each subpicture of the plurality of subpictures is created by successively filling a limited predetermined size of memory with image data.

10. The system of claim 9, wherein a lowest one of the plurality of levels has a lower resolution level and fewer subpictures than a higher one of the plurality of levels.

11. The system of claim 9, wherein a level of the plurality of levels represents the picture in its entirety.

12. The system of claim 9, wherein a lowest one of the plurality of levels includes one subpicture representing the picture in its entirety.

13. The system of claim 12, wherein a higher one of the plurality of levels includes a plurality of subpictures having a higher resolution than the lowest level.

14. The system of claim 9, wherein the picture comprises three-dimensional image data.

15. A graphics system for organizing and storing a picture, the graphics system comprising:

a processor; and a memory having computer software code stored therein, the processor and the memory being capable of:

receiving an element of the picture for storing on one of the plurality of levels of image data;

wherein each level of the plurality of levels comprises a set of subpictures having an amount of image data resolution that is different from an amount of image data resolution at other levels, each said level having a different number of subpictures;

wherein the set of subpictures in each said level of the plurality of levels is operable to cover an entire coordinate space of the picture without overlap;

identifying a subpicture in a lowest one of the plurality of levels in which the received element may be placed, wherein the lowest level represents a lowest resolution of image data, and wherein each subpicture stores a predetermined maximum amount of elements;

determining whether the identified subpicture has previously been loaded;

if the identified subpicture is determined not to have been loaded, loading the identified subpicture;

placing the received element in the identified subpicture;

determining if a number of elements in the identified subpicture exceeds the predetermined maximum;

if the number of elements in the identified subpicture exceeds the predetermined maximum, identifying a number of overlapping subpictures, in a higher one of the plurality of levels, into which the received element may be placed, wherein the higher level represents a higher resolution of image data than the lowest level, and wherein the subpicture in the higher level is capable of storing a larger number of elements than the subpicture in the lowest level; and wherein each subpicture of the plurality of subpictures is created by successively filling a limited predetermined size of memory with image data.

16. The graphics system of claim 15, further comprising a display for displaying the picture.

17. The graphics system of claim 15, wherein the processor and memory are further capable of:

determining if a number of elements in the identified subpicture of the higher level exceeds the predetermined maximum; and if the number of elements in the identified subpicture of the higher level exceeds the predetermined maximum, identifying a number of overlapping subpictures, in a next higher one of the plurality of levels, into which the received element may be placed, wherein the next higher level represents a higher resolution of image data than the higher level.

18. The graphics system of claim 15, wherein the processor and memory are further capable of, if the number of overlapping subpictures is zero, redefining the subpictures of the picture.

19. The graphics system of claim 15, wherein the processor and memory are further capable of:

receiving a new element of the picture for storing in one of the plurality of levels of image data; and repeating the steps of identifying, placing, and determining for the new element of the picture.

20. The graphics system of claim 15, wherein the picture comprises three-dimensional image data.

* * * * *